US010645949B2

(12) United States Patent
Cheney et al.

(10) Patent No.: US 10,645,949 B2
(45) Date of Patent: May 12, 2020

(54) COATED FROZEN CONFECTION

(71) Applicant: Conopco, Inc., Englewood Cliffs, NJ (US)

(72) Inventors: Paul Edward Cheney, Peterborough (GB); Andrew Hoddle, Rushden (GB)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 15/518,988

(22) PCT Filed: Oct. 15, 2015

(86) PCT No.: PCT/EP2015/073938
§ 371 (c)(1),
(2) Date: Apr. 13, 2017

(87) PCT Pub. No.: WO2016/062617
PCT Pub. Date: Apr. 28, 2016

(65) Prior Publication Data
US 2017/0238577 A1 Aug. 24, 2017

(30) Foreign Application Priority Data
Oct. 23, 2014 (EP) .................................. 14190047

(51) Int. Cl.
*A23G 9/48* (2006.01)
*A23G 9/44* (2006.01)

(52) U.S. Cl.
CPC ................. *A23G 9/48* (2013.01); *A23G 9/44* (2013.01); *A23V 2002/00* (2013.01)

(58) Field of Classification Search
CPC ....................................................... A23G 9/48
See application file for complete search history.

(56) References Cited

U.S. PATENT DOCUMENTS

| 2,191,352 | A | | 2/1940 | Oprean |
| 2,570,031 | A | | 10/1951 | Gibson |
| 4,952,414 | A | * | 8/1990 | Kaufman ................. A23C 9/13 426/103 |
| 5,082,682 | A | * | 1/1992 | Peterson ................. A23G 9/045 426/564 |
| 6,251,455 | B1 | | 6/2001 | Thomas |
| 6,338,863 | B1 | | 1/2002 | Amiel et al. |
| 6,565,902 | B2 | | 5/2003 | Ruano Del Campo et al. |
| 2002/0094362 | A1 | | 7/2002 | Ruano Del Campo et al. |
| 2005/0048168 | A1 | | 3/2005 | Koxholt et al. |
| 2011/0287147 | A1 | * | 11/2011 | Pannell ................. A23C 9/1315 426/89 |
| 2012/0100271 | A1 | * | 4/2012 | Leas ................. A23G 3/2092 426/306 |
| 2013/0259979 | A1 | * | 10/2013 | Pucci ................. A23G 9/506 426/90 |

FOREIGN PATENT DOCUMENTS

| EP | 0337536 | 11/1992 |
| EP | 0848910 | 6/1998 |
| EP | 0925722 | 6/1999 |
| EP | 1510134 | 3/2005 |
| EP | 1597974 | 11/2005 |
| WO | WO9529597 | 11/1995 |
| WO | WO9610338 | 8/1996 |
| WO | WO9838872 | 9/1998 |
| WO | WO02071862 | 9/2002 |
| WO | WO2009063010 | 5/2009 |
| WO | WO2012080360 | 6/2012 |
| WO | WO2013037741 | 3/2013 |

OTHER PUBLICATIONS

Arbuckle Ice Cream 2nd Edition AVI Publishing Company p. 266 (Year: 1972).*
W and R Chambers, "Chambers Dictionary of Science and Technology" 1971, p. 299. (Year: 1971).*
Perfect IceCream Bars and Snacks on a Stick with Silikomart!, Youtube, 2012, pp. 1-2; XP002738274; https://www.youtube.com/watch?v=PLHeiwD_NjE&list=PL_GXqYMyG2R54eow7Qb1BFGBjbUsjX6fq&index=4.
Silikomart ijsvorm ovaal 4 ijsjes 7×4 cm silicone wit 2-delig, Kookwinkel, 2015, pp. 1-2; XP002738275, considered only as disclosed—not in English.
Anonymous, Silikomart Easy Cream Lollievorm, Classic Mini, Kookpunt.nl, 2014, pp. 1-2; XP002738273; http://www.kookpunt.nl/silikomart-easy-cream-lollievorm-classic-mini/nl/oroduct/11950/, considered only as disclosed—not in English.
Dubey et al., Ice Cream Shrinkage: A Problem for Ice CreamIndustry, Journal of Dairy Science, 1997, pp. 3439-3444; XP27111061, vol. 80 No. 12.
IPRP in PCTEP2015073938, dated Oct. 19, 2016, pp. 1-8.
Search Report & Written Opinion in PCTEP2015073938, dated Jan. 18, 2016, pp. 1-15.
Search Report in EP14190047, dated Apr. 13, 2015, pp. 1-6.
Written Opinion in EP14190047 dated Apr. 13, 2015, pp. 1-5.

* cited by examiner

*Primary Examiner* — Kelly J Bekker
(74) *Attorney, Agent, or Firm* — Gerard J. McGowan, Jr.

(57) ABSTRACT

An aerated frozen confection coated in a coating, the frozen confection comprising a plurality of substantially flat faces, each substantially flat face having a radius of curvature substantially across the whole of the face of greater than 50 mm, and wherein the relatively flat faces meet to form edges, wherein substantially all or all of the edges have a radius of curvature of from 5 mm to 20 mm.

8 Claims, 2 Drawing Sheets

COATED FROZEN CONFECTION

TECHNICAL FIELD OF THE INVENTION

The present invention relates to coated frozen aerated confection products.

BACKGROUND TO THE INVENTION

Frozen confections which consist of ice cream, frozen yoghurt, or the like coated with chocolate, frozen fruit juice, or other coatings are popular products. These products are often supported on a stick so that they can be conveniently consumed without being held directly. Chocolate-coated stick products are one example of this type of product that have been known for many years.

Frozen confection products, including those on sticks are often produced by an "extrude and cut" process. This provides an uncoated frozen confection, which may at this stage already include a stick inserted in the confection.

More recently it has been proposed to manufacture frozen aerated products with cold roller apparatus the process comprising providing two rollers with open cavities on their surfaces, filling two cavities, one on each roller, with a frozen aerated material, wherein at least one of the cavities is filled with a frozen aerated product which is then allowed to expand outside its cavity, the two cavities then being moved opposite one another and the frozen aerated product in each cavity is pressed against the frozen aerated product in the other cavity. The product is thus formed from two halves and is self-releasing from the rollers.

Once manufactured, the uncoated frozen aerated confection can then be coated by dipping into a bath of liquid coating to form the coating or may also be sprayed or enrobed with liquid coating. Once coated, the frozen products are typically blast frozen and moved from the production area to the storage areas in the factory prior to distribution.

In some regions of the world such confections are manufactured at one altitude and then shipped and sold at another altitude. Such confections can also be manufactured at one altitude and experience different altitudes in the distribution chain for example when items are shipped via air freight or by road over mountain regions. Sometimes the difference in altitude can be significant. It has been observed that when such frozen aerated confections are shipped to a significantly higher altitude the coating applied can break and fall away from the surface of the frozen confection. Additionally, when such frozen confections are shipped to a significantly lower altitude, the coating applied is seemingly more easily damaged by mechanical shocks.

It would therefore be desirable to prevent these altitude-related problems from arising.

SUMMARY OF THE INVENTION

The present inventors have found that such altitude-related problems are caused by volumetric expansion or contraction of the frozen aerated confection. Such frozen aerated confections may comprise a significant quantity of gas bubbles entrapped within the confection. For example ice cream typically has around 30% by volume of gas.

When such gas is transported to a significantly different altitude, the entrapped gas either compresses or expands according to Boyle's Law. As the gas is entrapped within the frozen confection, such expansion or contraction will exhibit itself as an increase in the volume of the frozen confection as a whole.

Thus, when the frozen aerated confection is transported to a lower altitude the external pressure increases, which causes a contraction of the entrapped gas bubbles and a commensurate contraction of the frozen aerated confection. Such contraction then causes a spacing to appear between the frozen confection and the coating applied during manufacture. Such a spacing results in the coating being less able to resist mechanical shocks, as there is no frozen confection in contact with the coating to absorb a portion of any impacting mechanical energy. Thus, the net result is that the coating is more easily damaged by mechanical shocks.

When the frozen confection is transported to a higher altitude the external pressure decreases, which causes an expansion of the entrapped gas bubbles and a commensurate expansion of the frozen aerated confection. Such an expansion causes internal pressure on the coating applied during manufacture and can be sufficient to cause the coating to fail and thus crack and fall away from the surface of the frozen confection.

The present inventors have surprisingly found that, although the overall volumetric expansion/contraction cannot be easily prevented, its effects can be reduced.

The inventors have found that the resulting mechanical failures in the coating predominantly involve an edge between two relatively flat faces of a frozen confection. Upon further investigation the inventors have noted that frozen confections having edges between relatively flat faces do not have a uniform thickness of coating. In particular the coating at the edges can be noticeably thinner than the coating on the faces themselves.

This is explained because near the edges there will be proportionally more coating for a given amount of frozen confection at the immediate surface. Thus, heat will transfer from the liquid coating to the body of the frozen confection more slowly as the edges of the frozen confection become relatively warmer, thus reducing the driving force for heat transfer. The result of this is that the coating takes longer to crystallise or solidify at the edges and it therefore has an opportunity to flow away from the edges, thus making the coating thinner at the edges.

This observation leads to the conclusion that such edges are sources of mechanical weakness, particularly when there is expansion/contraction of the aerated frozen confection caused by altitude changes.

The present inventors have however surprisingly found that such thinning near the edges is strongly dependent upon the radius of curvature of the frozen confection at the edge.

Accordingly, the present invention relates to an aerated frozen confection coated in a coating, the frozen confection comprising a plurality of relatively flat faces, each relatively flat face having a radius of curvature substantially across the whole of the face of greater than 50 mm, and wherein the relatively flat faces meet to form edges, wherein substantially all or all of the edges have a radius of curvature of from 5 mm to 20 mm.

Thus, the inventors have realised that by ensuring that the edges do not have a radius of curvature of below 5 mm, the thickness of the coating at the edges surprisingly increases.

Thus, the edges no longer present such sources of mechanical failure. Although the volumetric expansion of the aerated frozen confection may remain present, its effects on the resulting mechanical damage caused is therefore reduced or eliminated.

The frozen confection of the present invention is aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\text{volume of frozen aerated product} - \text{volume of premix at ambient temp}}{\text{volume of premix at ambient temp}} \times 100$$

The amount of overrun present in the product will vary depending on the desired product characteristics. In the context of the present invention the level of overrun is typically from 50 to 150%, preferably from 60 to 100%.

In a preferred embodiment the at least one edge has a radius of curvature of from 6 mm to 15 mm, more preferably from 7 mm to 13 mm, or even from 8 mm to 12 mm.

Thus, the ratio of the thickness of the coating substantially across all of the relatively flat faces to that at the edges is preferably from 1.5:1 to 1:1.5, more preferably from 1.3:1 to 1:1.3.

The relatively flat faces may be essentially flat to the eye of a consumer. Alternatively they may comprise a slight bend or undulations, provided that such curves have a radius of curvature of greater than 50 mm, preferably greater than 100 mm. Preferably they are essentially flat with little or no curvature.

The thickness of the coating on the relatively flat faces can vary according to the particular design of frozen confection. However coating thicknesses of from 0.5 to 3 mm are preferred, more preferably from 1 mm to 2 mm.

In general the aerated frozen confection is comprised of relatively flat surfaces, and as such preferably at least 70%, more preferably at least 80%, of the total surface area of the aerated frozen confection is made up of such relatively flat faces.

In a preferred embodiment the aerated frozen confection is generally a rectangular cuboid with relatively flat faces at the front, back and/or sides. The relatively flat faces are connected by edges having a radius of curvature of from 5 to 20 mm.

In one preferred embodiment the aerated frozen confection comprises two essentially parallel relatively flat side faces which are joined together by their respective perimeters by a circumferential face. The circumferential face is relatively flat in the dimension normal to the surfaces of the side faces but curves in an orthogonal dimension, in order to join together the perimeters of said side faces.

Unless defined otherwise, all technical and scientific terms used herein have the same meaning as commonly understood by one of ordinary skill in the art (e.g. in frozen food manufacture). Definitions and descriptions of various terms and techniques used in frozen confection manufacture are found in "Ice Cream", 7th Edition R. T. Marshall, H. D. Goff and R. W. Hartel, Kluwer Academic/Plenum Publishers, New York 2013.

Frozen confection means a confection made by freezing a pasteurised mix of ingredients such as water, fat, sweetener, protein (normally milk proteins), and optionally other ingredients such as emulsifiers, stabilisers, colours and flavours. Frozen confections include ice cream, frozen yoghurt and the like. In a preferred embodiment the frozen confection is an ice cream.

The present invention typically utilises a frozen confection having at most 20 wt % of total sugars. As used herein the term "sugars" refers exclusively to digestible mono- and di-saccharides. The total sugar content of a frozen confection is thus the sum of all of the digestible mono- and di-saccharides present within the frozen confection, including any lactose from milk solids and any sugars from fruits. In preferred embodiments the frozen confection has at most 17.5 wt %, more preferably at most 15 wt %, more preferably still at most 12.5 wt %, yet more preferably at most 10 wt %, even more preferably at most 7.5 wt %, more preferably at most 6 wt % total sugars. Preferably the frozen confection contains at least 1 wt %, more preferably at least 2 wt %, more preferably still at least 5 wt % total sugars.

The frozen confection further typically contains stabilisers, the primary purposes of which is to produce smoothness in body and texture, retard or reduce ice and lactose crystal growth during storage, and to provide uniformity of product and resistance to melting. Additionally, they stabilize the mix to prevent wheying off, produce a stable foam with easy cut-off in the freezer, and slow down moisture migration from the product to the package or the air. The action of stabilisers in ice cream results from their ability to form gel-like structures in water and to hold free water. Iciness can be controlled by stabilizers due to a reduction in the growth of ice crystals over time, related to a reduction in water mobility as water is entrapped by their entangled network structures in the serum phase. Suitable stabilisers include one or more of tara gum, guar gum, locust been gum, carrageenan, gelatin, alginate, carboxymethyl cellulose, xanthan and pectin. The frozen confection contains at least 0.45 wt %, preferably at least 0.5 wt %, more preferably at least 0.55 wt %, more preferably still at least 0.6 wt %, even more preferably at least 0.75 wt %, yet more preferably at least 1.0 wt %, still more preferably at least 2.0 wt %, most preferably at least 5.0 wt % of stabilisers. Preferably the frozen confection contains at most 20 wt %, more preferably at most 15 wt %, more preferably still at most 12.5 wt %, even more preferably at most 10 wt %, most preferably at most 7.5 wt % of stabilisers.

The frozen confection may also contain non-saccharide sweetener which as defined herein consist of: The intense sweeteners aspartame, saccharin, acesulfame K, alitame, thaumatin, cyclamate, glycyrrhizin, stevioside, neohesperidine, sucralose, monellin and neotame; and The sugar alcohols HSH (hydrogenated starch hydrosylate—also known as polyglycitol), eythritol, arabitol, glycerol, xylitol, sorbitol, mannitol, lactitol, maltitol, isomalt, and palatinit. The frozen confection preferably contains at least 0.01 wt % of a non-saccharide sweetener, preferably at least 0.02 wt %, more preferably at least 0.03 wt %, more preferably still at least 0.04 wt %, yet more preferably at least 0.05 wt %, yet more preferably still at least 0.10 wt %, even more preferably at least 0.15 wt %, yet more preferably at least 0.20 wt %, more preferably at least 0.25 wt %, most preferably at least 0.50 wt % of a non-saccharide sweetener. Preferably the frozen confection contains at most 2.5 wt %, more preferably at most 2 wt %, more preferably still at most 1 wt % of a non-saccharide sweetener.

Preferably the product comprises at least 30 g, more preferably at least 40 g, more preferably still at least 50 g, yet more preferably at least 60 g, yet more preferably still at least 70 g, even more preferably at least 80 g, more preferably at least 100 g, yet more preferably at least 125 g, still more preferably at least 150 g, even more preferably at least 200 g frozen confection. Preferably the product comprises at most 500 g, more preferably at most 350 g, more preferably still at most 300 g, still more preferably at most 250 g, most preferably at most 225 g frozen confection.

As discussed, the present invention provides coated frozen confections. Coating means any edible material which can be used to form a coating layer on a frozen confection. Coatings may be fat-based, such as chocolate (dark chocolate, white chocolate, milk chocolate), or a chocolate analogue or couverture. The term "chocolate" is not intended to be limited to compositions that can legally be described as chocolate in any particular country but includes any products having the general character of chocolate. It therefore includes chocolate-like materials which are made using fats other than cocoa butter (for example coconut oil). Chocolate usually contains non-fat cocoa solids, but it is not essential that it does so (e.g. white chocolate). The term chocolate analogue means chocolate-like fat-based confection compositions made with fats other than cocoa butter (for example cocoa butter equivalents, coconut oil or other vegetable oils). Such chocolate analogues are sometimes known as couvertures. Chocolate analogues need not conform to standardized definitions of chocolate which are used in many countries. In addition to fat and cocoa solids, chocolate and chocolate analogues may contain milk solids, sugar or other sweeteners and flavourings. A fat-based coating may consist essentially of vegetable oil and sugar, together with colours and/or flavours as required.

The coating can also be water-based, such as frozen water ices, fruit juices and fruit purees.

Frozen confection products, including stick based frozen confections, can be coated using various different techniques. The frozen confection can be dipped into liquid coatings for a certain time to form the coating. The most commonly used method of dipping, on an industrial scale, is to hold products upside down by their sticks on an indexing conveyor. The conveyor moves the products, stepwise, toward a dipping bath. When over the bath, the products are pushed down in to the coating, pulled back up and then indexed away by the conveyor. In a simpler and cheaper dipping method, the ice cream products are continuously moved though the bath. The products are initially held upside down by their sticks. They are then rotated into a horizontal position in order to clear the side of the bath. They are then rotated back to the upside down (vertical) position, thereby dipping the ice cream into the coating while the products are moved along the length of the bath. At the end of the bath they are rotated back to the horizontal position to clear the edge of the tank. Finally they are rotated back to the upside down position to allow the coating to set and the excess coating to run-off. As an alternative to dipping, spraying can be used to coat products, in particular stick based products. Enrobing can be used to coat products without sticks. The product is placed on a mesh conveyor belt and passed through a waterfall of coating (known as a curtain) typically formed by pumping liquid coating through an aperture in the form of a horizontal slot. This operation coats the top, front, back and sides of the bar. An air knife may be used to blow off the excess coating, which drains through the mesh conveyor. Finally, the mesh conveyor carries the product into a shallow bath of coating thereby immersing the bottom of the product and coating it.

Coatings are applied to the frozen confection as liquids, but solidify when they are cooled down, for example as a result of contact with the frozen confection. Chocolates have complex solidification behaviour because they contain mixtures of different triglycerides which can crystallize in different forms. For example, cocoa butter can exist in six different crystalline forms (polymorphs). As chocolate solidifies, triglycerides begin to crystallize. Within a few seconds the chocolate becomes dry to the touch and has plastic or leathery texture. Crystallization continues slowly, so that it typically takes several hours or days for the triglycerides to fully crystallize and so that the chocolate reaches its maximum brittleness. Chocolate made from fats other than cocoa butter displays similar behaviour, but typically crystallizes over a narrower temperature range and reaches maximum brittleness more quickly. Similarly, water based coatings freeze to create a lattice work of ice crystals around the frozen confection core. Preferably the coating is chocolate.

The product can be partially coated but in a preferred embodiment it is fully coated. Preferably the product comprises at least 5 g, more preferably at least 10 g, more preferably still at least 15 g, yet more preferably at least 20 g, still more preferably at least 25 g, even more preferably at least 30 g, yet more preferably at least 40 g, most preferably at least 50 g of coating. Preferably the product comprises at most 100 g, more preferably at most 80 g, more preferably still at most 70 g, most preferably at most 60 g of coating.

Preferably the ice content of the aerated frozen confection at −12° C. is at least 40 wt %, more preferably at least 45 wt %, more preferably still at least 50%, yet more preferably at least 55 wt %, most preferably at least 60 wt %. Preferably the ice content of the frozen confection at −12° C. is at most 70 wt %, more preferably at most 65 wt %, most preferably at most 60 wt %.

Preferably the ice content of the aerated frozen confection at −8° C. is at least 40 wt %, more preferably at least 45 wt %, more preferably still at least 50%, yet more preferably at least 55 wt %, most preferably at least 60 wt %. Preferably the ice content of the frozen confection at 8° C. is at most 70 wt %, more preferably at most 65 wt %, most preferably at most 60 wt %.

BRIEF DESCRIPTION OF THE FIGURES

FIG. 2 is a chart showing the percentage of samples that showed cracking as a function of the pressure the samples were taken to.

EXAMPLES

Example 1—Coating Thickness

Ice cream confectionery compositions were produced by extruding the ice cream and cutting the extruded ice cream into pieces with a wire. It was found that such ice cream confectioneries were naturally produced with edges and corners having a radius of curvature of approximately 3 mm.

Each ice cream composition comprised two essentially parallel relatively flat side faces which are joined together by their respective perimeters by a circumferential face. The circumferential face is relatively flat in the dimension normal to the surfaces of the side faces but curves in an orthogonal dimension, in order to join together the perimeters of said side faces.

The radius of curvature of the edges where the faces join each other was varied by removing a small amount of ice cream from the edges with a heated knife and measuring with radius gauges.

The ice cream confectioneries were coated in a chocolate composition by dipping the ice cream into a liquid bath of molten chocolate. The coating was formed by removing the ice cream confectionery from the bath and allowing the chocolate coating to crystallise.

The thickness of the chocolate coating on the flat faces was measured to be approximately 1.4 mm±0.1 mm. This was measured by cutting cross sections of the product, taking pictures of the coating using a microscope and then analysing these pictures (determining magnification factor by taking an image of a graticule and then counting number of pixels over the depth of chocolate) to derive a chocolate thickness. In total, 26 measurements of chocolate thickness were made (13 evenly spaced measurements over the entire face×2 flat faces).

Figure 1:
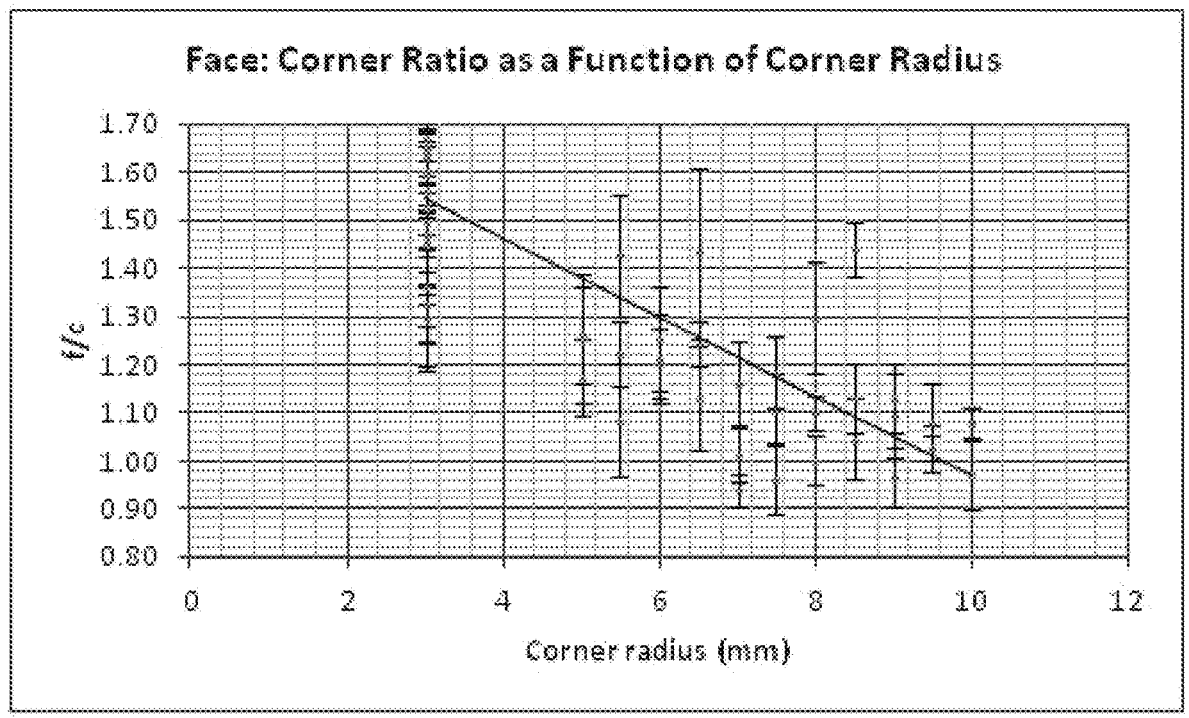
FIG. 1 is a chart showing the ratio of the coating thickness at the faces to the coating thickness at the corners as a function of corner radius.

The thickness of the chocolate coating at the edges was also measured (same method as above), taking 26 (13 evenly spaced measurements over the edges circumference×2 edges) measurements per ice cream confectionery. The results were plotted as a ratio of the thickness at the face to the thickness at the edge as a function of radius of curvature of the edge or corner. The results are shown in FIG. 1.

Although there is some scatter in the figure, it can be clearly seen that there is a trend towards having more consistent thickness of chocolate coating with increasing radius of curvature at the edges and corners.

Example 2—Altitude Cracking

In order to simulate potential problems arising when moving to a different altitude, tests were carried out on the produced coated ice cream confectioneries.

A batch of 20 ice cream confectioneries which all had edges and corners with a radius of curvature of approximately 3 mm were placed in a pressure chamber.

All samples were equilibrated to −18° C. for 8-12 hours prior to altitude testing. 20 of each sample type were loaded in to an Angelantoni TD 150 C thermostatic altitude chamber at −18° C. and ambient pressure (approx. 1000 mbar). The pressure inside the chamber was then reduced by 25 mbar at a rate of 470 mbar min$^{-1}$ and held at this pressure for 2.5 hours. Following this, the chamber was returned to ambient pressure, opened and the number of samples with cracked chocolate coating was noted. Following sample inspection, the chamber was re-sealed and pressure reduced by a further 25 mbar (at a rate of 470 mbar min$^{-1}$) and holding this pressure for 2.5 hours. This process of reducing the pressure in 25 mbar increments, waiting 2.5 hours and then inspecting the products was repeated until the pressure had been reduced to 775 mbar.

Figure 2:
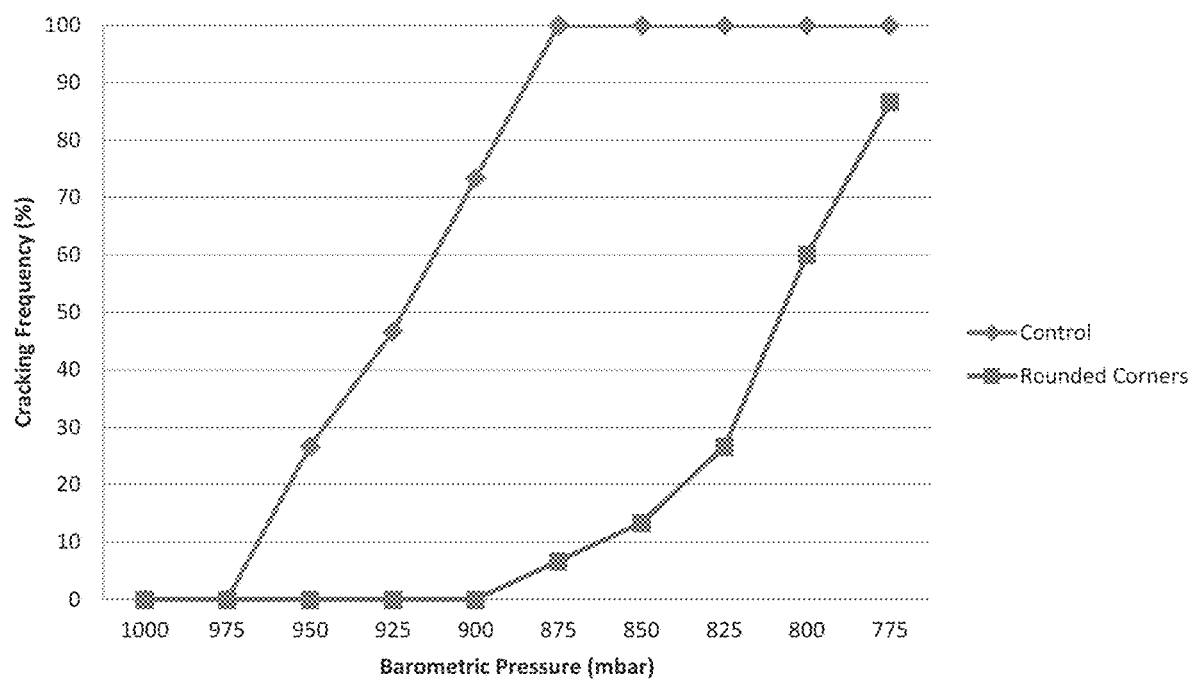

The percentage of coated ice creams that had a crack in the coating were noted and the results plotted in FIG. 2.

As can be seen, when the target pressure is 875 mbar, 100% of the coated ice creams had cracked coatings.

The experiment was repeated with ice cream confectioneries with edges and corners having a radius of curvature of 10 mm. The results are also shown in FIG. 2.

As can be seen, when the target pressure is 875 mbar, only 5% of the coated ice creams had cracked coatings.

The invention claimed is:

1. A product comprising an aerated frozen confection coated in a coating, the aerated frozen confection comprising a plurality of faces, each face having a radius of curvature substantially across the whole of the face of greater than 50 mm, and wherein the faces meet to form edges, wherein the edges have a radius of curvature of from 5 mm to 20 mm, and at least 70%, of the total surface area of the aerated frozen confection is made up of the faces and wherein the product is a rectangular cuboid with the exception of the radius of curvature of each of the faces and the radius of curvature of each of the edges, and there are faces at the front, back and sides of the rectangular cuboid.

2. A product according to claim 1, wherein the level of overrun of the aerated frozen confection is from 50 to 150%.

3. A product according to claim 1, wherein the edges have a radius of curvature of from 6 mm to 15 mm.

4. A product according to claim 1, wherein the ratio of the thickness of the coating substantially across all of the faces to that at the edges is from 1.5:1 to 1:1.5.

5. A product according to claim 1, wherein the thickness of the coating on the faces is from 0.5 to 3 mm.

6. A product according to claim 1, wherein at least 80% of the total surface area of the aerated frozen confection is made up of the faces.

7. A product according to claim 1, wherein the frozen confection is frozen yoghurt or an ice cream.

8. A product according to claim 1, wherein the coating is chocolate.

* * * * *